(No Model.)

G. F. SIMONDS.
BALL BEARING.

No. 466,446. Patented Jan. 5, 1892.

Witnesses.
Robert Everett,
J. A. Rutherford.

Inventor:
George F. Simonds.
By James L. Norris
Atty.

BALL-BEARING.

UNITED STATES PATENT OFFICE.

GEORGE F. SIMONDS, OF FITCHBURG, MASSACHUSETTS.

BALL-BEARING.

SPECIFICATION forming part of Letters Patent No. 466,446, dated January 5, 1892.

Application filed February 24, 1891. Renewed November 6, 1891. Serial No. 411,099. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to ball-bearings of that class in which separate circular series or groups of spherical rollers or balls for sustaining the radial pressure and resisting the end-thrust of a shaft or axle are arranged in different planes and on different diameters between rings or annular or tubular pieces secured to the axle or shaft.

My present invention is an improvement on the construction described in Letters Patent No. 434,479, granted to me August 19, 1890, and has for its object to provide means for removing the spherical rollers or balls and their inclosing rings in a body, whereby they are better adapted for application to the bearings of bicycles, sewing-machines, pulleys, and other parts in various kinds of like machinery.

The invention consists in the construction, arrangement, and combination of parts in a ball-bearing, as hereinafter described and claimed.

Figure 1:
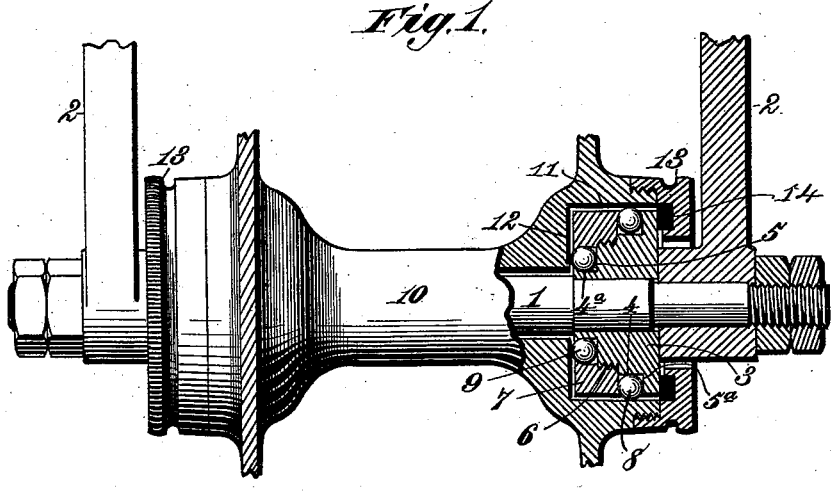
Figure 2:
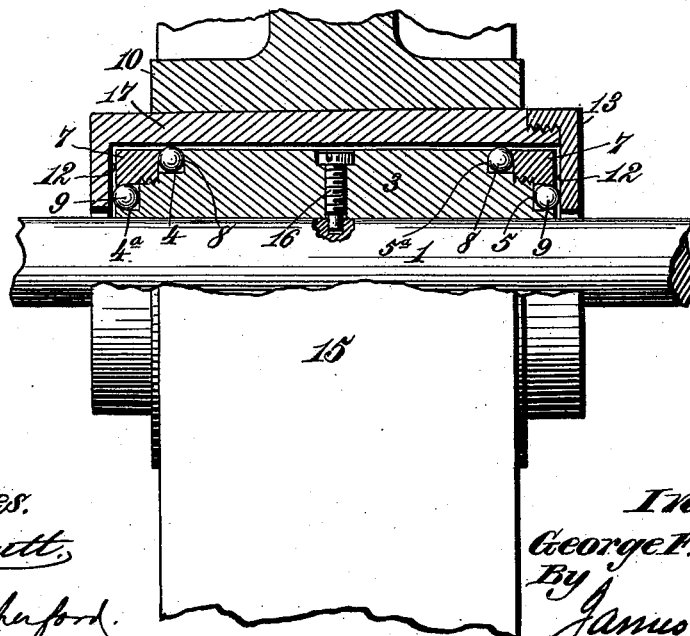

In the annexed drawings, Figure 1 is a partly-sectional elevation illustrating my invention as applied to a bicycle. Fig. 2 is a similar view showing the application of the invention to a pulley.

Referring to the drawings, the numeral 1 designates a shaft or axle, which, as shown in Fig. 1, may be supported in a fork 2 of a bicycle. On the axle 1 is secured a ring or tubular piece 3, having concentric surfaces 4 and 4ª and shoulders 5 and 5ª, that are substantially at right angles to said concentric surfaces. Each ring or tubular piece 3 is provided with a screw-threaded portion 6, that engages a similar screw-threaded portion of a ring 7, which is thus connected with the ring or tubular piece 3 and together therewith forms a cage for retaining spherical rollers or balls 8 and 9 in operative position and enables them to be readily removed and replaced in a body without difficulty or loss of time. If desired, some or all of the surfaces of the rings 3 and 7 in contact with the balls 8 and 9 may be concaved, as shown, to form curved channels for said balls to run in. The hub 10 of the wheel or pulley is recessed to receive the rings 3 and 7, and in the interior of the recessed hub is an annular surface 11, concentric with the rings 3 and 7, and a plane vertical surface 12, parallel with the corresponding surfaces of said rings.

In the case of bicycles and some other machines the wheel-hub 10 may be recessed at each end for the reception of rings 3 and 7 near each end of the axle. After the rings 3 and 7 have been placed on the axle within the recessed hub the ends of the hub will be closed by means of annular screw-caps 13, in each of which may be placed a packing-ring 14, Fig. 1, to exclude dust and moisture.

As shown in Fig. 2, the hub 10 of the pulley 15 may be recessed its entire length, except at one end, where the plane surface or shoulder 12 may be formed either in said hub or in a bushing 17, and after the pulley is in place on the ball-bearing the other end of the pulley, hub, or other similar part will be closed by an annular cap 13, having an inner plane vertical bearing-surface 12, that corresponds with the shoulder at the other end of the hub. In this construction a single ring or tubular piece 3 will be employed, said ring being provided at each end with concentric surfaces 4 and 4ª and screw-threads 6 to connect with the rings 7, and the said ring 3 may be secured to the shaft or axle 1 by means of a screw 16 or other suitable means. If desired, the hub may be provided with a bushing 17 of steel. It will be observed that in both forms of construction the spherical rollers or balls 8 for sustaining radial pressure or weight are arranged to revolve freely in all directions on and in bearing contact with the parallel concentric surfaces 4 and 11 of the ring or rings 3 and hub or other rotary or stationary part 10, respectively, while the balls 9 for resisting end-thrust are arranged to revolve in like manner against and in bearing-contact with the vertical parallel surfaces 5 and 12 of said parts. The surfaces 4ª and 5ª of the ring 3, in connection with the corresponding surfaces of the ring 7, serve to hold the balls 9 and 8, respectively, in operative position.

By arranging the balls for sustaining radial pressure and those for resisting end-thrust in groups of different diameters and on different planes, as shown, a compact and convenient ball-bearing is provided for bicycles, sewing-machines and many situations in which economy of space is desirable. The rings 3 and 7, that confine the balls, being securely connected together enables the balls to be readily handled or inserted and removed in a body with great ease, thus avoiding the annoyances and difficulties resulting from a separate handling of the balls and which would be incurred by placing them in the bearing separately, instead of in a body.

I do not herein broadly claim a ball-bearing wherein the balls are arranged in circular series or groups of different diameters and in different planes between concentric and plane surfaces formed on inner and outer rings or tubular pieces, as such is described and claimed in Letters Patent No. 434,479, granted to me August 19, 1890.

What I claim as my invention is—

1. In a ball-bearing, the combination, with a circular group of spherical rollers or balls for sustaining radial pressure or weight and another circular group of balls for resisting end-thrust, of connected rings or annular pieces having concentric and vertical surfaces that form channels for retaining the balls in groups of different diameters and in different planes and whereby said balls and their retaining-rings are removable in a body, substantially as described.

2. In a ball-bearing, the combination, with an axle or shaft and a hub or other part surrounding said axle or shaft and provided with a concentric surface 11 and a plane vertical surface 12, of the detachably-connected rings 3 and 7, secured to the axle or shaft and provided in different planes with annular channels of different diameters, and the circular groups of spherical rollers or balls 8 and 9, arranged in said channels and removable in a body with said connected rings, substantially as described.

3. In a ball-bearing, the combination of a ring or tubular piece having a ball-bearing surface, a ring detachably connected therewith, a part having a ball-bearing surface parallel with that of said tubular piece, and a circular group of spherical rollers or balls adapted to revolve freely in all directions and held and retained by said rings in position to work between and against said parallel bearing-surfaces, said balls, tubular piece, and connected ring being removable in a body, substantially as described.

In testimony whereof I have hereunto set my hand and affixed my seal in presence of two subscribing witnesses.

GEO. F. SIMONDS. [L. S.]

Witnesses:
JAMES A. RUTHERFORD,
GEO. W. REA.